United States Patent Office 3,512,989
Patented May 19, 1970

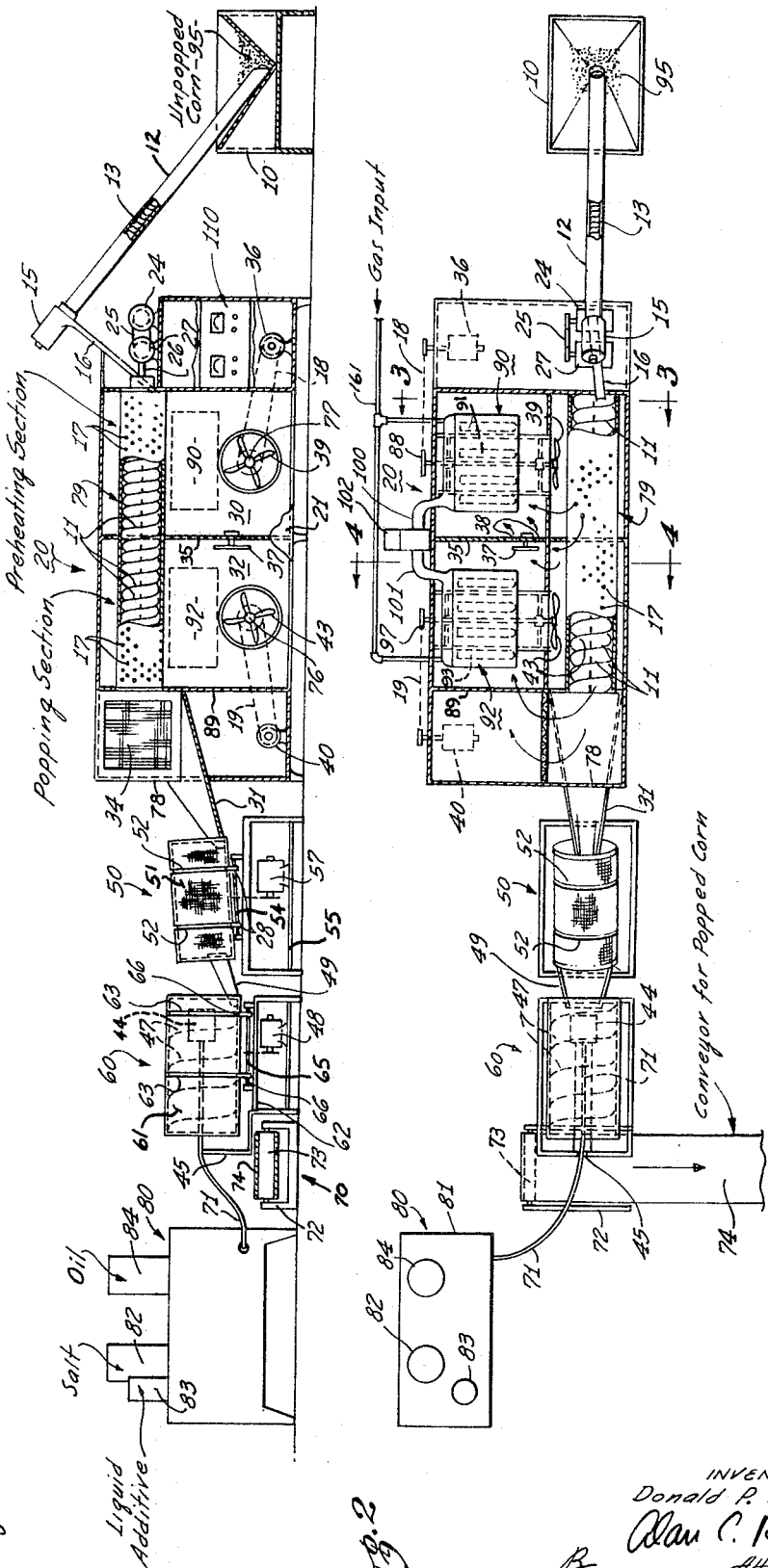

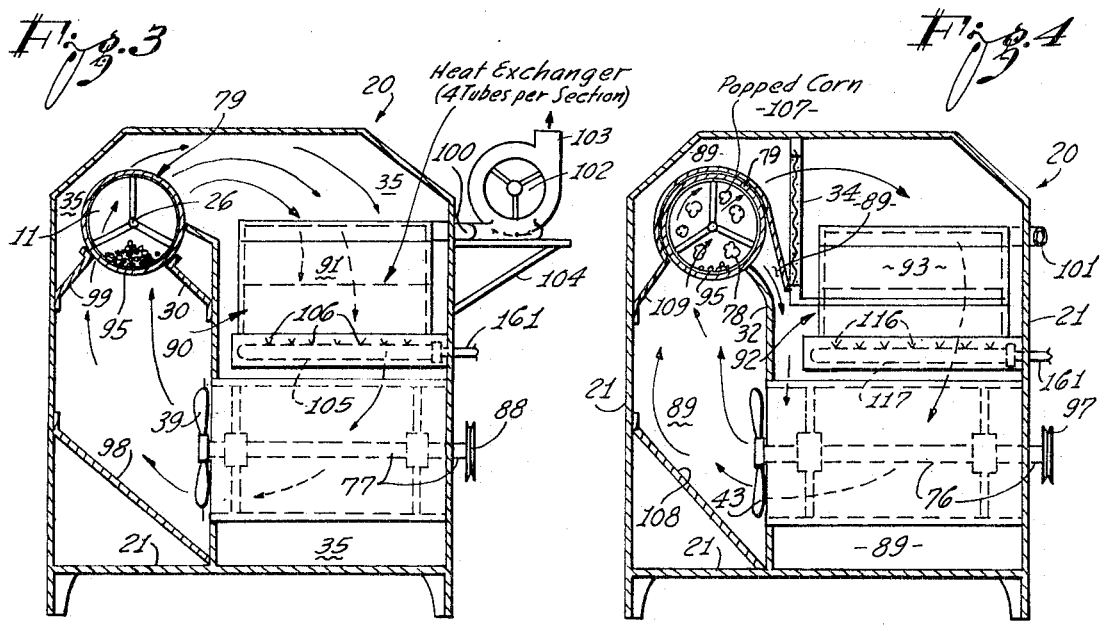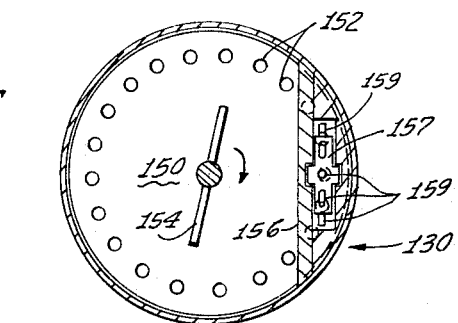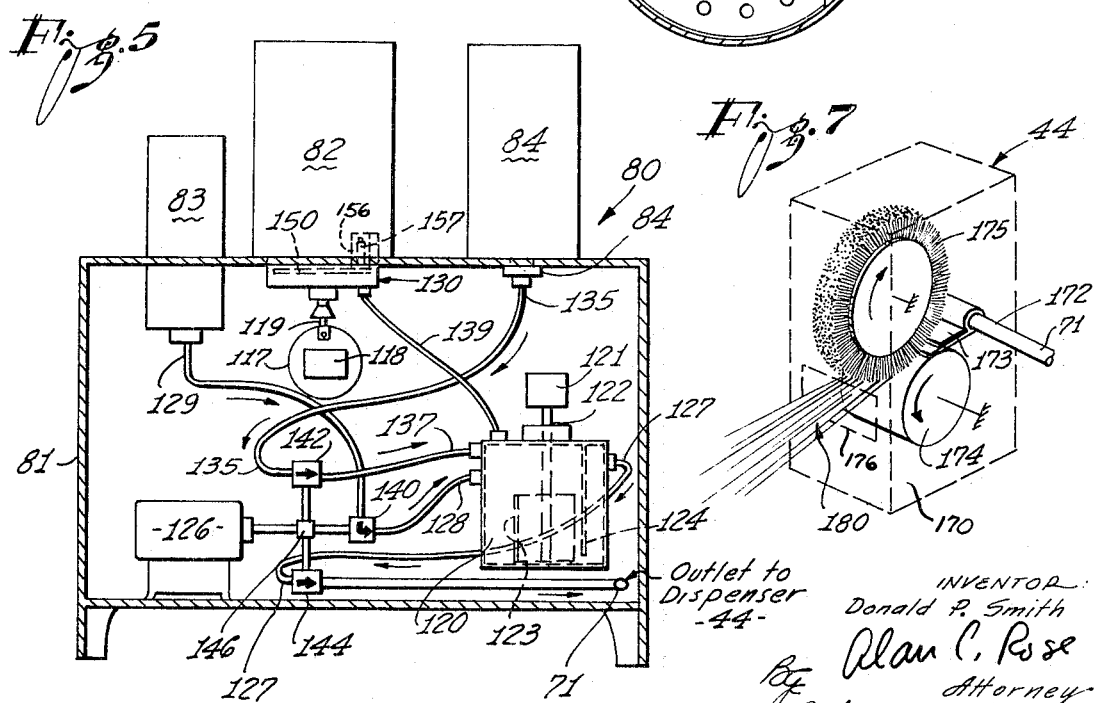

3,512,989
CONTINUOUS POPPING APPARATUS
AND METHOD
Donald P. Smith, 4530 Woodfin Drive,
Dallas, Tex. 75220
Filed Dec. 28, 1965, Ser. No. 516,838
Int. Cl. A23l 1/18
U.S. Cl. 99—81                                      20 Claims

ABSTRACT OF THE DISCLOSURE

A continuous popping apparatus including two successive heating stages including a pre-heating section, in which the material to be popped is heated to a temperature just below the temperature required for popping, and a popping section, in which the food to be popped is heated to a temperature above that required for popping. The material to be popped is continuously and positively moved through the pre-heating and the popping sections while hot gas is applied thereto to assure uniform heating.

BACKGROUND OF INVENTION

This invention relates to a continuous popping apparatus, and in particular, to apparatus in which very large quantities of food material are popped.

In the apparatus which has previously been proposed for the popping of popcorn and other food materials, the resultant product has in many cases been incompletely popped and is often burned and only partially popped. In addition, wastage is high and the complete popping which should produce a light and uniformly tasty product is not achieved. Many of the prior art devices for popping corn employ a single heat source and rely on a relatively low velocity air stream to apply heat to the popcorn. The temperature in the air stream frequently reaches 500° F. to over 1,000° F. in order to heat the popcorn sufficiently rapidly that it will not dry out and become burned by long exposure to the heat. Thus, if a low temperature just over the popping temperature of about 400° F. to 475° F. were employed, the time required to reach popping temperature would be so great that the kernel would lose a great deal of moisture through the open germ end of the kernel, and would pop poorly. When the very high temperatures of 500° F. to over 1,000° F. are used, a high temperature gradient is set up through the kernels of corn and the outer portion of the kernel may reach popping temperature before the entire kernel is properly pre-heated. This results in incompletely popped corn. In addition, the outer portion of the kernel may be burned prior to popping because of the very high temperature.

SUMMARY OF INVENTION

A principal object of the present invention is to avoid incomplete popping and burning of food materials as they are popped, and to increase the uniformity and quality of high production popping systems.

In accordance with an important aspect of the present invention, the foregoing objects are achieved through the use of a continuous popping apparatus including two successive heating stages. As mentioned above, the critical temperatures for the popping of corn are in the vicinity of 400° F. to 500° F. Specifically, I have found that popcorn can be superheated to temperatures approximating 390° F. However, when any portion of the kernel reaches 410° F., the entire unit pops. While there is much variation in the threshold of popping between different strains of popcorn and different kernels of the same strain, rarely does popping occur below 340° F. and most kernels do not pop until they are at a temperature of over 390° F.

In accordance with an illustrative embodiment of my invention applicable to the popping of corn, the first or preheating section of the popping apparatus is maintained at a temperature of over 260° F. but not exceeding 410° F., and preferably between 300° F. and 390° F. In the second or popping section of the heating apparatus, the temperature is maintained at a temperature of 390° F. to 530° F., and preferably between 410° F. and 475° F., until the popcorn is popped. More generally, for food material other than popcorn the temperature range for preheating should be between two-thirds of the popping temperature and below it, while the temperature range for popping should be between minimum popping temperature and one-third higher temperature in terms of degrees Fahrenheit.

I have also discovered that it is important to have the popcorn positively moved through the heating zones and to have it fully exposed to the temperature of both the preheating and the popping sections of the apparatus. In accordance with an illustrative embodiment of my invention, this is achieved by the use of a perforated tube through which the corn is moved, first through the preheating and then through the popping section of the apparatus. In addition, high velocity streams of hot air are applied to the popcorn as it is moved through the sections of the apparatus so that all of the corn reaches the desired preheating or popping temperature and little wastage occurs. To achieve the desired full heating of the corn to the desired temperature, air streams of velocity of more than three hundred and preferably more than five hundred feet per minute are applied to the material to be popped. With regard to timing, it has been determined that a period of one to one-and-one-half minutes in the preheating section, and a period of from one-half to two minutes in the popping section of the apparatus are desirable.

In the disclosed illustrative embodiment of the apparatus, baffles are provided to constrain circulating air to flow through the perforated tube, and suitable fans are provided for imparting the higher velocity to the circulating air. In the preheating section, the air is directed to the lower portion of the rotating tube through which the material to be popped is moved, and the air is permitted to freely escape from the other sides of the perforated tube. In the popping section, however, it is desirable that the baffle partly enclose the upper surface of the perforated tube so that air carries the popped corn toward the exit chute of the apparatus. The heavier unpopped kernels remain within the tube for the full timing cycle. This last mentioned mode of operation is accomplished through the use of narrow helical vanes on the inner surface of the rotating perforate tube. Once the kernels have popped, they are expelled by the hot air along the length of the tube to its exit end over the peripheral vanes. In this way, the popped kernels are moved promptly from the heating zone immediately after they are popped.

The hot air is preferably heated through one or more heat exchangers to avoid the burned or gassy taste which is characteristic of food produced by open flame poppers.

Following the popping step the corn is routed through a rotating cylindrical screen having openings large enough to pass unpopped kernels of corn.

In accordance with another aspect of the invention, the corn is then seasoned in an apparatus including an outer cylindrical drum having relatively narrow helical vanes and an open central region. As the cylinder is rotated to move the popped corn along its length and to tumble the popcorn about, seasoning is sprayed onto the corn. In accordance with an illustrative seasoning apparatus shown in the drawings, a brush rotating at high speed may be mounted within or adjacent to the rotating cylinder to spray any desired solution, such as seasoning, coloring or the like, onto the popped corn.

The novel features which are believed to be characteristic of the invention, both as to its organization and method of operation, together with further objects and advantages thereof, will be better understood from the following description considered in connection with the accompanying drawings in which an illustrative system embodying the principles of the invention is illustrated by way of example. It is to be expressly understood, however, that the drawings are for the purpose of illustration and description only, and are not intended as a definition of the limits of the invention.

DESCRIPTION OF DRAWING

In the drawings:

FIG. 1 schematically illustrates a system, constructed in accordance with teachings of the present invention, for continuously producing popcorn;

FIG. 2 shows a top view of the system illustrated in FIG. 1;

FIG. 3 is a sectional view of a popper apparatus of the system illustrated in FIGURES 1 and 2 taken generally along the line 3—3 of FIG. 2;

FIG. 4 is another sectional view of the popper apparatus of the system illustrated in FIGS. 1 and 2 taken generally along the line 4—4 of FIG. 2;

FIG. 5 illustrates the structural details of a seasoning blender apparatus of the system shown in FIGS. 1 and 2;

FIG. 6 is a top view of a portioning mechanism of the seasoning blender illustrated in FIG. 5; and FIG. 7 is an isometric view of a seasoning dispenser employed in the system illustrated in FIGS. 1 and 2.

DESCRIPTION OF A PREFERRED EMBODIMENT

Referring now to the drawings, wherein like or corresponding parts are designated by similar reference characters throughout the several views, there is shown in FIGS. 1 and 2 a system for continuously producing popcorn from unpopped kernels. The system is shown to include a hopper 10 in which unpopped corn 95 is kept. A conveyor 12 including an Archimedes screw 13 draws the unpopped corn 95 from the hopper 10 and deposits it within a popper apparatus 20 of the system. The unpopped corn 95, as it is conveyed through the popper apparatus 20, is first preheated to a first predetermined temperature and, then, heated further to a second predetermined temperature greater than the first temperature. The grain moves through the popper apparatus 20 until the grain has poped forming popcorn or until a predetermined time period has lapsed. In either vent, the popcorn and the residue of unpopped corn 95 moves from the popper apparatus 20 through a chute 31 to a sifter 50, wherein the residue of unpopped corn 95 is separated from the popped corn. The popped corn is expelled from the sifter 50 through a chute 49 into a seasoning apparatus 60. In the seasoning apparatus 60, the kernels of popped corn are sprayed by a seasoning dispenser 44 with a seasoning mixture prepared in and pumped from a seasoning blender 80. The seasoned popcorn is conveyed through the seasoning apparatus 60 and then expelled from the end thereof onto a conveyor 70 which leads to packaging machines that prepare the popped corn in boxes for shipment and sale.

Referring now in greater detail to the popcorn producing system illustrated in FIGS. 1 and 2, it may be seen that a motor 15 turns the Archimedes screw 13 so that the Archimedes screw will pick up the unpopped corn 95 from the hopper 10. The unpopped corn 95 is conveyed from the hopper 10 to the top of the conveyor 12 where the unpopped corn is dropped through a chute 16 into an agitating tube 79 within the popper apparatus 20. The tube 79 is constructed to have a plurality of perforations 17 therein, smaller in size than the kernels of unpopped corn 95, and a spiral conveyor 11 on the inside peripheral surface for moving the unopped corn 95 from the input end of the tube 79 to the output end thereof (from right to left, as shown in the drawings). A shaft 26 projects from the input end of the tube 79 and is connected thereto. A motor 24 is coupled to the shaft 26 through a speed reducer 27 (which is coupled to the motor 24 by means of a belt drive 25) for rotating the shaft 26 thereby rotating the agitating tube 79. The speed of rotation of the agitating tube 79 is adjusted so that the spiral conveyor 11 will positively move the unopped corn 95 through a preheating section of the popper apparatus 20 for a period of one to one-and-one-half minutes and, then, through a popping section of the popper apparatus 20 for a period of one-half to two minutes. During these time periods, in the preheating section of the popper apparatus 20 the unpopped kernels of corn 95 are subjected to a stream of hot air having a velocity of over 500 feet per minute and a temperature of greater than 300° F. but not exceeding 410° F. Air within the preheating section of the popper apparatus 20 is heated by a heat exchanger 90 which generally comprises a down-draft furnace unit, such as one manufactured by the Folsom Furnace Company of Dallas, Tex., which comprises a number of heat exchange tubes 91 which are heated by an internal gas flame. Air is drawn past the heat exchange tubes 91 by a fan 39 which may be one of a number of suitable types, such as an elbow fan, size 19-E, manufactured by the L. J. Wing Manufacturing Company of Linden, N.J.

Attention is now directed to FIG. 3 where there is shown a cross-section of the popper apparatus 20 taken through the preheating section thereof. As shown in FIGURE 3, the fan 39 is mounted on one end of a shaft 77 to the other end of which is mounted a pulley 88. A belt 18 couples the pulley 88 to an electric motor 36 (shown in FIGS. 1 and 2) which rotates the fan 39. The heat exchanger unit 91 includes a casting 105 in which a number of gas jets 106 are provided. Gas is supplied through a pipe 95, connected to the casting 105, for a gas flame at the gas jets 106. Fumes and heat from the flame pass through the plurality of heat exchanger tubes 91 to an exhaust manifold 100. The exhaust manifold 100 is connected to a blower 102 which is mounted on a platform 104 and which draws the fumes and heat from the gas jets 106 through the heat exchanger tubes 91 and exhausts the fumes through a pipe 103.

Thus, air drawn by the fan 39 through the heat exchanger unit 90 may be elevated to a predetermined temperature of over 300° but not exceeding 410° F. This temperature is constantly monitored by standard, well-known temperature measuring and control devices on a control panel 110 (shown in FIG. 1). The gas flame at the jets 106 is regulated to maintain the air temperature within the selected range. The hot air in the preheating section is blown by the fan 39 through the perforations 17 in the agitating tube 79. A baffle 98 is mounted to a front frame panel 21 of the popper apparatus 20 beneath the agitating tube 79 to direct the flow of air upward from the fan 39. The unpopped corn 95 generally rests in the bottom of the agitating tube 79 and is continually moved about by the rotation of the agitating tube. A baffle 99 and a baffle 30 direct the heated air from the fan 39 toward the bottom of the agitating tube 79 where the unpopped corn 95 is being moved by the spiral conveyor 11. The hot air in the preheating section uniformly heats all kernels of the unpopped corn 95 for a controlled time to a temperature just below their popping temperature, generally above 390° F.

Referring again to FIG. 1, it should be noted that the side frame 21 of the popper apparatus 20 has been broken away to show the structures of the preheating section and popping section which are inside thereof. Thus, the baffle 30 in the preheating section is shown to have the fan 39 protruding therethrough. It may be seen in both FIGS. 1 and 2 that a baffle 35 divides the popper apparatus 20 into the preheating section and a popping section. The baffle 35 is provided with a damper assembly 37 which partially blocks the passage of air through a number of holes 38 in the baffle 35. The damper 37 is provided in the baffle 35 so that small amounts of air from the preheating section of the tube 79, rather than passing through the perforations 17 in the tube and directly back to the heat exchanger 90, pass through the tube 79 past the baffle 35 and then back to the heat exchanger 90 through the holes 38 in the baffle 35. One skilled in the art will appreciate that air is allowed to pass from the preheating section to the popping section within the tube 79 so that kernels of corn which are popped in the popping section of the popper apparatus 20 are not blown back into the preheating section through the tube 79 by high velocity air in the popping section.

After the unpopped corn 95 has passed from the input end of the tube 79 to a location in the tube 79 approximately in the area of the baffle 35, each kernel of unpopped corn 95 has been uniformly preheated to a temperature just below its popping temperature. The preheating temperature of the kernels, as measured on the average of the kernels' mass, does not exceed 390° F. and the time of preheating does not exceed one-and-one-half minutes. These conditions are within the ranges outlined above and typically cannot pop representative popcorn. However, such temperatures bring the kernels of unpopped corn 95 up to a temperature such that any greater temperature applied to the kernels will cause them to pop. And, in fact, the kernels of unpopped corn 95 are conveyed by the spiral conveyors 11 within the tube 79 from the preheating section to the popping section of the popping apparatus 20. In the popping section, the kernels of unpopped corn 95 are moved or agitated by the rotation of the tube 79 and are subjected to a stream of air having a velocity of over 500 feet per minute and a temperature of between 400° F. and 475° F. Generally, the kernels are subjected to these popping conditions for a period of time of between one-half and two minutes. The high velocity stream of hot air in the popping section is produced by apparatus similar to that found in the preheating section. A heat exchanger unit 92, as shown in FIGS. 1 and 2, heats the air which is drawn by a fan 43 down through the heat exchanger unit 92 and blown up through the perforations 17 in the tube 79. The fan 43 is driven by an electric motor 40, which is coupled to the fan 43 by means of a pulley 97 mounted to the fan's drive shaft 76, and a belt coupling the pulley 97 to the motor 40.

Further details of the structures of the popping section of the popper apparatus 20 will be described with reference to FIGS. 2 and 4. It may be seen in FIG. 4 that the fan 43 is mounted to one end of the shaft 76 to the other end of which is coupled the pulley 97. Rotation of the shaft 76 by the motor 40 turns the fan and causes air to be drawn down through the heat exchanger unit 92, the heat exchanger tubes 93, and out through an aperture in a baffle 32. The baffle 32 extends upward so as to direct air from the fan 43 towards the bottom of the tube 79 where the kernels of unpopped corn 95 are being agitated or tumbled by the rotation of the tube 79 and the high velocity air coming through the perforations 17. A baffle 108 is mounted beneath the tube 79 in the preheating section and in front of the fan 43 for directing hot air moved by the fan 43 up toward the tube 79. The tube 79 in the preheat section is partially surrounded by a solid baffle 89 which directs air up through the perforations 17 in the tube 79 and the majority of that air out other perforations 17 on the opposite side of the tube 79 back to the heat exchanger 92. It should be noted, however, that some of the air directed by the fan 43 through perforations 17 in the bottom of the tube 79 passes out the output end of the tube 79 taking with it those kernels of corn which have popped. As the kernels of unpopped corn 95 are subjected to the high velocity stream of hot air (having a velocity of over 500 feet per minute and a temperature of between 400° F. and 475° F.) controlled heat transfer from the hot air to the kernels is achieved. Between the time of one-half to two minutes, the kernels of unpopped corn 95 are heated just enough to trigger a maximum "pop" from the center of the kernel, resulting in a light, white, fluffy popcorn 107 which usually pops up out of the unpopped kernels 95 into the stream of air exiting the output end of the tube 79. Those kernels of unpopped corn 95 which are larger in size, or for other reasons require greater lengths of time to pop, stay in the lower portion of the tube 79 until they do, in fact, pop or until they are conveyed by the spiral conveyor 11 to the end of the tube 79.

As the kernels 95 pop to form the popcorn 107, they are picked up by the airstream flowing toward the output end of the tube 79 and are blown out the end of the tube 79. The popcorn 107 so expelled from the tube 79 hits a baffle 78 in line with the tube 79 near the end thereof. Such popcorn kernels then drop onto a chute 31. Those kernels of popcorn 107 which are not expelled from the tube 79 by the airstream, are moved by the spiral conveyor 11 through the popping section until they fall from the output end of the tube 79 onto the chute 31. The air which has left the agitating tube 79 through the output end thereof returns to the preheater 92 through a screen 34 which prevents popcorn kernels from entering the heat exchanger 92 and yet allows the air to freely pass therethrough so that it may again be heated by passage through the heat exchanger 92.

It should be noted at this time that the heat exchanger 92, like the heat exchanger 90 described above, is shown as a downdraft furnace having a casting 117 supplied with gas from the gas pipe 161 for a gas flame at a plurality of jets 116 on the casting 117. Fumes and heat rfom rality of jets 116 on the casting 117. Fumes and heat from the gas flame are drawn up through heat exchange tubes 93 and out through an exhaust manifold 101 by the blower 102. The temperature of the air moved from the fan 43 to the tube 79 is sensed and controlled by standard well-known devices, the operating controls of which are mounted on the control panel 110.

Thus, it may be seen that in the popper apparatus 20 the kernels of unpopped corn 95 are heated in two steps to form the kernels of popcorn 107. In each of the two sections of the popper apparatus 20, high velocity streams of hot air are constrained to flow through perforations in the agitating tube 79 which is positively conveying the unpopped kernels of corn through the popper apparatus 20. In the first section of the popper apparatus 20, the preheating section, each of the kernels of unpopped corn 95 are preheated to a controlled temperature just below their popping temperature by rotating the agitating tube 79 and applying a high velocity stream of hot air from the fan 39. Continued movement of the kernels of unpopped corn 95 in the tube 79 causes them to be subjected, in the popping section of the apparatus 20, to a high velocity stream of hot air at a greater controlled temperature than in the preheating section sufficient to trigger the kernels into popping. The kernels of unpopped corn 95 are thereby changed in the popping section of the apparatus 20 into the kernels of popcorn 107 in a much more efficient manner than has heretofore been proposed.

It has been found, for example, that by maintaining the velocity of the air in the preheat section to 1000 feet per minute, the time of preheating to 105 seconds, the temperature of the preheat section at 385° F., the temperature of the popping section at 415° F., and an air velocity of 1000 feet per minute in the popping section, the kernels of unpopped corn 95 passing through the agitating tube 79 and subjected to such heating conditions expanded to give popcorn having a final density of 116 grams per gallon. This density is compared to popcorn from the same lot which gave the higher density of 122 grams per gallon when popped in a standard oil popper, such as is used for expansion tests. Moreover, waste was found to be less than two percent by using the apparatus of the present invention.

The kernels of popcorn 107, together with those few kernels of unpopped corn 95, are blown or dropped, respectively, onto the chute 31 through which they leave the popper apparatus 20 and enter a barrel 51 of the sifter 50. The barrel 51 is constructed of wire screen having apertures therein larger than the kernels of unpopped corn 95 but smaller than the kernels of popcorn 107. The barrel is provided with a pair of roller tracks 52 rigidly secured to the outside peripheral surface of the barrel 51. An electric motor 57 is belt-coupled to a shaft 54 which is supported by trunnions on a frame 55 of the sifter 50. A pair of rollers 28 are mounted on the shaft 54 and frictionally engage the tracks 52 on the barrel 51. Rotation of the rollers 28 by the motor 57 causes the barrel 51 to rotate for separating the residue of unpopped corn 95 from the kernels of popcorn 107. The residue drops through the wire screen, is gathered, and is discarded as waste. Because the barrel 51 is mounted on the frame 55 so that its input end is higher than its output end, thereby providing an inclined internal surface, the kernels of popcorn 107 move through the barrel 51 as it rotates and exit the sifter 50 through a chute 49 which leads to a barrel 61 of the seasoning apparatus 60.

The seasoning apparatus 60 comprises a metal cylinder forming the barrel 61 having a spiral conveyor on the inside peripheral surface thereof for moving the kernels of popcorn 107 from the chute 49 to the conveyor 70, as shown in FIGS. 1 and 2. The barrel 61 has a pair of roller tracks 63 on the outside peripheral surface of the barrel which frictionally engage with a pair of rollers 66 secured to a shaft 65. The shaft 65 is supported by trunnions on a frame 62 of the seasoning apparatus 60, and is coupled to an electric motor 48 for being rotated thereby. Rotation of the rollers 66 by the motor 48 causes the barrel 61 to turn at a slow rate of speed, thereby conveying the kernels of popcorn 107 from the chute 49 to a belt 74 of the conveyor 70.

It will be noted in FIGS. 1 and 2 that a cantilevered support arm 45 is coupled to the frame 62 and extends to a location within the barrel 61. The arm 45 supports a seasoning dispenser unit 44 for applying, for example, salt, food coloring and flavoring oil to the kernels of popcorn 107 as they pass through the seasoning apparatus 60. The seasoning dispenser 44 is shown schematically in FIG. 7 to include a container 170 having an aperture 176 therein. A hose 71 supplies seasoning from the seasoning blender 80 to the seasoning dispenser 44. The seasoning coming from the hose 71 is deposited in the container 170 of the dispenser 44. A rotatable wheel 174 picks up the seasoning from the container 170. The wheel 174 is positioned so that it engages with a brush wheel 175 which brushes the seasoning picked up by the wheel 174 into a spray 180 of seasoning. The spray 180 exits the dispenser 44 through the aperture 176 and falls on the kernels of popcorn 107. The wheels 175 and 174 may be rotated, for example, by an electric motor (not shown) coupled directly to the wheel 175 and through a speed reducer (not shown) to the wheel 174. The first wheel 174 may be rotated, for example, in a counter-clockwise direction at a speed of 200 revolutions per minute; while the second brush wheel 175 may be rotated in a clockwise direction at a speed of 1750 revolutions per minute. These speeds have been found to be sufficient to produce the spray 180 having a sufficient density and dispersal area to properly coat the kernels of popcorn 107 with seasoning.

The kernels of popcorn 107, having been seasoned within the seasoning apparatus 60, drop from the end of the barrel 61 thereof onto the conveyor belt 74 of the conveyor system 70. As shown in FIGS. 1 and 2, the conveyor belt 74, which is shown to be mounted on an idler pulley 73, coupled to a frame 72, transports the kernels of seasoned popcorn to packaging machines where the popcorn is prepared for shipment and sale.

As noted above, seasoning is applied to the seasoning dispenser 44 by the seasoning blender 80 through the hose 71. In FIGS. 1 and 2 the seasoning blender 80 is shown to include a salt drum 82, an oil drum 84, and a liquid additive drum 83, all three of which are mounted on a frame member 81 of the seasoning blender 80. In FIG. 5, the details of the mechanism for mixing three such seasoning ingredients stored within the above-noted containers are shown. Salt stored within the drum 82 often becomes caked and this solid mass must be broken up. For this reason, the lower portion of the drum 82 is provided with a salt portioning mechanism 130 as shown in FIGS. 5 and 6. The portioning mechanism 130 comprises a metal plate 150 having a handle 154 rising thereabove which breaks up the salt stored in the drum 82 so that the salt will deposit in a plurality of holes 152 in the plate 150. The plate 150 is coupled through a shaft 119 and a speed reducer 118 to an electric motor 117. The electric motor 117 rotates the plate 150 so that the holes 152 therein pick up salt as it is broken up by the handle 154. The holes 152 of the plate 150 fill with salt and pass under a plate 156. The plate 156 is positioned as a chord of the circular cross-section of the portioning mechanism 130 and rises above the surface of the plate 150. A spoked wheel 157 is rotatably mounted between the plate 156 and the casing of the portioning mechanism 130. The wheel 157 has a plurality of spokes 159 therearound which engage with the holes 152 in the plate 150 for driving the salt from those holes as the plate 150 rotates. The wheel 157 is rotated by the plate 150 so that selected amounts (depending on the speed at which the plate 150 is rotated by the motor 117) of salt are punched from the plate 150 and delivered from the portioning mechanism 130 through a tube 139 into a mixer can 120.

Simultaneously, a variable speed DC motor 126 drives three similar pumps 140, 142, and 144 through a gear box 146. The pumps 140, 142 and 144 may be, for example, a Model C–600 pump, a Model 3010–1 pump and a Model 3010–1 pump, respectively, manufactured by Blue-White Industries, Ltd., of Santa Monica, California. A liquid additive (such as, food coloring, flavoring, and liquid concentrate) stored within the drum 83 is pumped from the drum 83 through a tube 129, through the pump 140 and a tube 128 to the mixer can 120. At the same time, cooking oil stored within the drum 84 is pumped from the drum 84 through a tube 135, through the pump 142 and a tube 137 to the mixer can 120. The salt and liquid additive are mixed into the oil within the mixer can 120 by a paddle blade 123 connected to a shaft 122. An electric motor 121 rotates the shaft 122, thereby rotating the paddle 123, and causes the seasoning ingredients to be mixed into a uniform seasoning solution. So as to keep the uniform seasoning solution relatively separate from the ingredients thereof as they enter the mixer can 120, a separator 124 is provided at one side of the mixer can 120. From a location behind the separator 124, a tube 127 is connected to the mixer can 120 which leads to the pump 144. The pump 144 pumps the seasoning solution through the hose 71 to the seasoning dispenser 44 located in the seasoning apparatus 60.

Thus, it may be seen that the system described herein for continuously producing superior quality, seasoned popcorn from kernels of unpopped corn and the method therein embodied is a noteworthy improvement over prior art devices and methods employed for the same purpose. It is to be understood, however, that the above-described arrangements are illustrative of the application of the principles of the invention. Numerous other arrangements within the scope of the invention may be devised by those skilled in the art. Thus, by way of example and not of limitation, food products other than popcorn, such as a popped cereal or rind product, may be processed in the apparatus described above. In addition, the structural implementation of the invention may be varied through the use of a vibrating and transversely moving screen-type belt to restrain and carry popcorn through the preheating and popping sections of the popper apparatus 20. Moreover, other mechanical structures for heating the air blown through such a porous agitating belt or through the tube 79 may be used. Other methods of separating the kernels of popcorn 107 from the residual kernels of unpopped corn 95 also may be devised by those skilled in the art to replace the sifter apparatus 50 described above, without departing from the scope of the invention.

What is claimed is:

1. A continuous food popping apparatus comprising in combination:
    a preheating section;
    means for maintaining said preheating section at a preheating temperature just below the temperature required for popping;
    a popping section;
    means for maintaining said popping section at a popping temperature above but not greatly in excess of the temperature required for popping;
    means for positively and continuously moving food material to be popped through said preheating section and through said popping section at desired rates;
    perforated means for blowing air through all of said food material in said preheating section at a high velocity at said preheating temperature; and
    perforated means for blowing air through all of said food material in said popping section at said popping temperature.

2. A popping apparatus as set forth in claim 1 wherein the means for moving food material is a perforated tube with rotating helical vanes.

3. A popping apparatus as set forth in claim 1 wherein baffles are employed to direct the hot air through the moving food material and to force air flow toward the exit end of the popping section.

4. A popping apparatus as set forth in claim 1 wherein the food moving means is of open construction to permit application of the high velocity air and includes means for restraining movement of kernels at rates greater than said desired rates while permitting passage of popped material toward the exit from said popping section, and means for directing air toward the exit from said popping section to carry popped food material promptly from the popping section after it is popped.

5. A popcorn popping apparatus as set forth in claim 1 wherein:
    means are provided for maintaining said preheating section at a temperature of between 300° F. and 390° F.;
    means are provided for maintaining said popping section at a temperature of between 410° and 475°.

6. A popping apparatus as set forth in claim 1 wherein means are provided for moving the hot air through the food to be popped in said preheating and popping sections at a velocity of at least 300 feet per minute.

7. A popping apparatus as set forth in claim 1 wherein:
    said food moving means retains the food to be popped in said preheating section for between one and one and one-half minutes, and
    wherein said food moving and blowing means include means for retaining food which remains unpopped in said popping section for at least one and one-half minutes and removes popped food from said popping zone promptly upon popping.

8. A popcorn apparatus as set forth in claim 1 wherein: said temperature maintaining means include a heat exchanger for avoiding undesirable contamination of the flavor of the food being processed.

9. A popping apparatus as set forth in claim 1 wherein:
    means are provided for maintaining said preheating section at a temperature of between 300° F. and 390° F.;
    means are provided for maintaining said popping section at a temperature of between 410° and 475°.
    means are provided for moving the hot air through the food to be popped in said preheating and popping sections at a velocity of at least 300 feet per minute;
    said food moving means retains the food to be popped in said preheating section for between one and one and one-half minutes, and
    wherein said food moving and blowing means include means for retaining food which remains unpopped in said popping section for at least one and one-half minutes and removes popped food from said popping zone promptly upon popping.

10. The combination called for in claim 1 with the addition of a popped food seasoning apparatus comprising:
    a seasoning channel,
    means for tumbling and moving popped food through said seasoning channel; and
    means for spraying seasoning onto said popped food as it is passing through said seasoning channel.

11. The combination called for in claim 10 wherein said spraying means includes a high-speed rotary brush.

12. The combination called for in claim 10 wherein said spraying means includes means for holding a reservoir of mixed seasoning liquid, a roller which dips into said liquid, and a high-speed rotary brush for flinging liquid picked up on said roller onto the tumbling popped food.

13. A dual heat zone continuous popping apparatus for food material having a predetermined popping temperature comprising in combination:
    means providing a first region heated to a temperature measured in degrees Fahrenheit between two-thirds of said popping temperature in degrees Fahrenheit and said predetermined popping temperature in degrees Fahrenheit;
    means providing a second region heated to a discretely different and significantly higher temperature between the predetermined popping temperature in degrees Fahrenheit and a temperature one-third higher than said popping temperature in degrees Fahrenheit;
    means for continuously and positively moving said food material through said first region at a suitable rate to bring the temperature of all of the food close to that of the region without adversely affecting the edibility of the food;
    means for moving unpopped food through the second region at a relatively slow rate until popped; and
    means for expelling said food material from said second region as soon as it is popped.

14. A popping apparatus as set forth in claim 13 further comprising:
    a seasoning channel,
    means for tumbling and moving popped food from said second region through said seasoning channel; and
    means including a high-speed rotating brush for spraying seasoning onto said popped food as it is passing through said seasoning channel.

15. A dual heat zone continuous popping apparatus for food material having a predetermined popping temperature comprising in combination:
    means providing a first region heated to a temperature measured in degrees Fahrenheit between two-thirds of said popping temperature in degrees Fahrenheit and said predetermined popping temperature in degrees Fahrenheit;
    means providing a second region heated to a discretely different and significantly higher temperature between the predetermined popping temperature in degrees Fahrenheit and a temperature one-third higher than said popping temperature in degrees Fahrenheit;
    means for continuously and positively moving said food material through said first region at a suitable rate to bring the temperature of all of the food close to that of the region without adversely affecting the edibility of the food;

means for moving unpopped food through the second region at a relatively slow rate until popped;

means for expelling said food material from said second region as soon as it is popped;

a sifter for receiving and separating popped and unpopped food material from said second region; and a seasoning apparatus for receiving popped food from said sifter, said seasoning apparatus including a rotating cylinder for tumbling the popped food, means for spraying liquid onto the food as it is tumbled, and means for intimately mixing and supplying said mixture of a liquid, salt and other ingredients to the spraying means.

16. An apparatus as defined in claim 15, wherein said spraying means includes a high-speed brush for flinging the mixture onto the popped food, and wherein said mixing means includes dry storage for salt, containers for at least two fluids, a mixing vessel for receiving salt and fluids, and a pump for applying the resultant mixture to said spraying means.

17. A method for popping food material comprising the steps of:

feeding the material to be popped continuously at a controlled uniform rate through two zones of discretely different temperatures, the first zone being at a preheating temperature between two-thirds of the popping temperature measured in degrees Fahrenheit and the popping temperature measured in degrees Fahrenheit and the second zone being at a popping temperature just above the temperature required for popping; and circulating air of the preheating and the popping temperatures through the food material in the preheating and popping zones, respectively, at high velocity.

18. A method as defined in claim 17 wherein:

the circulating air is blown through the food at a velocity of at least 400 feet per minute to agitate the food and thoroughly heat the food to the temperature of the air.

19. A method as set forth in claim 17 wherein:

air is circulated in said second zone at a velocity sufficient to blow popped food out of said second zone, but at a velocity sufficiently low that unpopped food is not blown out of said popping zone.

20. A method of popping food material comprising the steps of:

feeding the material to be popped continuously through two zones of discretely different temperatures, the first zone being at a pre-heating temperature between 300° F. and 410° F. and the second zone being at a popping temperature between 400° F. and 475° F.;

retaining the material in said first zone for between one and one and one-half minutes; and circulating air of the pre-heating and the popping temperatures through the food material in the first and second zones, respectively, at a velocity of at least 300 feet per minute.

References Cited

UNITED STATES PATENTS

| | | | |
|---|---|---|---|
| 518,664 | 4/1894 | Donathen | 99—81 |
| 874,570 | 12/1907 | Cairncross | 118—24 |
| 904,186 | 11/1908 | Eckstein | 99—81 |
| 2,522,448 | 9/1950 | Husk et al. | |
| 2,843,080 | 7/1958 | Woodruff | 99—238.4 XR |
| 3,167,035 | 1/1965 | Benson | 118—19 XR |

LIONEL M. SHAPIRO, Primary Examiner

J. R. HOFFMAN, Assistant Examiner

U.S. Cl. X.R.

99—238.4, 238.6; 118—19, 24, 300